(12) United States Patent
Tiwari et al.

(10) Patent No.: US 12,063,711 B2
(45) Date of Patent: Aug. 13, 2024

(54) PROCEDURE TO UPDATE THE PARAMETERS RELATED TO UNIFIED ACCESS CONTROL

(71) Applicant: NEC Corporation, Tokyo (JP)

(72) Inventors: Kundan Tiwari, Tokyo (JP); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 480 days.

(21) Appl. No.: 17/289,474

(22) PCT Filed: Oct. 11, 2019

(86) PCT No.: PCT/JP2019/040155
§ 371 (c)(1),
(2) Date: Apr. 28, 2021

(87) PCT Pub. No.: WO2020/095617
PCT Pub. Date: May 14, 2020

(65) Prior Publication Data
US 2021/0409934 A1 Dec. 30, 2021

(30) Foreign Application Priority Data
Nov. 8, 2018 (IN) .............................. 201811042142

(51) Int. Cl.
*H04W 8/22* (2009.01)
*H04W 8/18* (2009.01)
(Continued)

(52) U.S. Cl.
CPC ............. *H04W 8/22* (2013.01); *H04W 8/183* (2013.01); *H04W 12/30* (2021.01); *H04W 12/71* (2021.01); *H04W 12/72* (2021.01)

(58) Field of Classification Search
CPC ....... H04W 12/30; H04W 8/22; H04W 12/14; H04W 12/71; H04W 12/03; H04W 12/72;
(Continued)

(56) References Cited

U.S. PATENT DOCUMENTS

| 11,751,051 B2* | 9/2023 | You ........................ H04W 12/72 726/6 |
| 2021/0037380 A1* | 2/2021 | Lee ........................ H04W 28/02 |

(Continued)

FOREIGN PATENT DOCUMENTS

CN 108683510 A 10/2018

OTHER PUBLICATIONS

International Search Report for PCT Application No. PCT/JP2019/040155, mailed on Nov. 19, 2019.
(Continued)

*Primary Examiner* — Brian D Nguyen
(74) *Attorney, Agent, or Firm* — Sughrue Mion, PLLC

(57) ABSTRACT

The present disclosure relates to a method for a user equipment, UE, which includes a mobile equipment, ME, and a subscriber identity module, SIM. The method comprises checking whether the ME and the SIM have a 5th generation, 5G, specific parameter or not, and sending, to a network node, a first message containing a first information element, IE, indicating whether the UE has a valid 5G specific parameter or not, so as to fetch a 5G specific parameter value from a unified data management, UDM.

20 Claims, 12 Drawing Sheets

(51) Int. Cl.
  *H04W 12/30*      (2021.01)
  *H04W 12/71*      (2021.01)
  *H04W 12/72*      (2021.01)

(58) Field of Classification Search
  CPC ....... H04W 8/24; H04W 12/37; H04W 12/06; H04W 8/183; H04W 60/04
  See application file for complete search history.

(56) References Cited

U.S. PATENT DOCUMENTS

| | | | |
|---|---|---|---|
| 2021/0212021 A1* | 7/2021 | Youn | H04W 60/00 |
| 2021/0250771 A1* | 8/2021 | Hu | H04L 63/1416 |
| 2021/0306969 A1* | 9/2021 | Merino Vazquez | H04W 48/02 |
| 2021/0321303 A1* | 10/2021 | Nair | H04L 63/0281 |
| 2021/0360569 A1* | 11/2021 | Park | H04W 28/0289 |
| 2022/0007150 A1* | 1/2022 | Edge | H04W 4/20 |

OTHER PUBLICATIONS

3rd Generation Partnership Project, "Technical Specification Group Services and System Aspects; Vocabulary for 3GPP Specifications (Release 15)", 3GPP TR 21.905 V15.0.0, Mar. 2018, pp. 1-66.

3rd Generation Partnership Project, "Technical Specification Group Services and System Aspects; System Architecture for the 5G System; Stage 2 (Release 15)", 3GPP TS 23.501 V15.2.0, Jun. 2018, pp. 1-216.

3rd Generation Partnership Project, "Technical Specification Group Services and System Aspects; Procedures for the 5G System; Stage 2 (Release 15)", 3GPP TS 23.502 V15.2.0, Jun. 2018, pp. 1-308.

3rd Generation Partnership Project, "Technical Specification Group Core Network and Terminals; Non-Access-Stratum (NAS) protocol for 5G System (5GS); Stage 3 (Release 15)", 3GPP TS 24.501 V15.0.0, Jun. 2018, pp. 1-337.

3rd Generation Partnership Project, "Technical Specification Group Radio Access Network; NG-RAN; NG Application Protocol (NGAP) (Release 15)", 3GPP TS 38.413 V15.0.0, Jun. 2018, pp. 1-264.

3rd Generation Partnership Project, "Technical Specification Group Radio Access Network; NR; Radio Resource Control (RRC) protocol specification (Release 15)", 3GPP TS 38.331 V15.3.0, Sep. 2018, pp. 1-445.

3rd Generation Partnership Project, "Technical Specification Group Core Network and Terminals; Characteristics of the Universal Subscriber Identity Module (USIM) application (Release 15)", 3GPP TS 31.102 V15.2.0, Oct. 2018, pp. 1-307.

3rd Generation Partnership Project, "Technical Specification Group Core Network and Terminals; UICC—terminal interface; Physical and logical characteristics (Release 15)", 3GPP TS 31.101 V15.1.0, Oct. 2018, pp. 1-36.

3rd Generation Partnership Project, "Technical Specification Group Services and System Aspects; Security architecture and procedures for 5G system (Release 15)", 3GPP TS 33.501 V15.1.0, Jun. 2018, pp. 1-152.

3rd Generation Partnership Project, "Technical Specification Group Services and System Aspects; Service requirements for the 5G system; Stage 1 (Release 15)", 3GPP TS 22.261 V15.6.0, Sep. 2018, pp. 1-53.

3rd Generation Partnership Project, "Technical Specification Group Core Network and Terminals; Numbering, addressing and identification (Release 15)", 3GPP TS 23.003 V15.5.0, Sep. 2018, pp. 1-128.

3rd Generation Partnership Project, "Technical Specification Group Services and System Aspects; SService requirements for Machine-Type Communications (MTC); Stage 1 (Release 14)", 3GPP TS 22.368 V14.0.1, Aug. 2017, pp. 1-26.

3rd Generation Partnership Project, "Technical Specification Group Core Network and Terminals; Non-Access-Stratum (NAS) protocol for 5G System (5GS); Stage 3 (Release 15)", 3GPP TS 24.501 V15.1.0, Sep. 2018, pp. 1-398.

Extended European Search Report for EP Application No. 19881690.2 dated on Nov. 16, 2021.

Qualcomm Incorporated, "Update of Default Configured NSSAI in the UE", 3GPP Draft, SA WG2 Meeting #129, S2-1810407, Oct. 9, 2018.

Huawei et al, "Definition of PEI", 3GPP Draft, 3GPPT TSG CT WG4 Meeting #86, C4-186037, Aug. 10, 2018.

* cited by examiner

First byte:

Second byte:

Byte 1: first byte of 5G-GUTI for 3GPP access

Byte 13: first byte of last visited registered TAI for 3GPP access

Byte 1 of this TLV value field: first byte of the value part of the NAS security algorithms information element Coding:
- Each access identity configuration is coded on one bit.

Byte 1:

PROCEDURE TO UPDATE THE PARAMETERS RELATED TO UNIFIED ACCESS CONTROL

This application is a National Stage Entry of PCT/JP2019/040155 filed on Oct. 11, 2019, which claims priority from Indian Patent Application 201811042142 filed on Nov. 8, 2018, the contents of all of which are incorporated herein by reference, in their entirety.

TECHNICAL FIELD

The present disclosure relates to a method for a UE.

BACKGROUND ART

3GPP defines new security mechanism in 5th generation mobile system on top of the 4th generation mobile system. As the 5G security is more secure than a one in the 4th generation, 3GPP specifications for 5G require more dedicated security functionalities to each 5G entities. The USIM is not an exception. The USIM for 5G has more parameters and functionalities than the USIM for 4G or older generations.

A 5G UE can comprise a 5G Mobile Equipment and UICC containing USIM having 5G specific DF for supporting 5G specific functionality (e.g. Concealing of SUPI) and EFIMSI. The DF5GS (5G specific DF) has EF storing the security parameters (Home Network Public Key, Home Network Public Key ID, and Protection Scheme ID) to conceal the SUPI. FIG. 7 illustrates the 5G UE configuration.

CITATION LIST

Non Patent Literature

NPL 1: 3GPP TR 21.905: "Vocabulary for 3GPP Specifications". V15.0.0 (2018-03).
NPL 2: 3GPP TS 23.501: "System Architecture for the 5G System; Stage 2". V15.2.0 (2018-06).
NPL 3: 3GPP TS 23.502: "Procedures for the 5G System; Stage 2" V15.2.0 (2018-06).
NPL 4: 3GPP TS 24.501: "Non-Access-Stratum (NAS) protocol Stage 3" V15.0.0 (2018-06).
NPL 5: 3GPP TS 38.413: "NG Application Protocol (NGAP)" V15.0.0 (2018-06).
NPL 6: 3GPP TS 38.331": "Radio Resource Control (RRC) protocol specification" V15.3.0 (2018-09).
NPL 7: 3GPP TS 31.102: "Characteristics of the Universal Subscriber Identity Module (USIM) application" V15.2.0 (2018-10)
NPL 8: 3GPP TS 31.101:"UICC-terminal interface; Physical and logical characteristics" V15.1.0 (2018-10)
NPL 9: 3GPP TS 33.501:"Security architecture and procedures for 5G system" V15.1.0 (2018-6)
NPL 10: 3GPP TS 22.261:"Service requirements for the 5G system; Stage 1" V15.6.0 (2018-9)
NPL 11: 3GPP TS 23.003:"Numbering, addressing and identification" V15.5.0 (2018-9)
NPL 12: 3GPP TS 22.368:"Service requirements for Machine-Type Communications (MTC); Stage 1" V14.0.1 (2017-8)

SUMMARY OF INVENTION

Technical Problem

On the other hands, 5G system provides the personal mobility service as the same way with older generations. The personal mobility service is realized by separating the USIM (i.e. SIM card) and the ME (i.e. Terminal equipment). If user has the 4G compliant USIM, user may be able to have 5G services with the 5G compliant ME.

Or if user has the 4G compliant USIM, user may not be able to have 5G services with the 5G compliant ME. Currently an interworking between non-5G compliant USIM (e.g. 4G compliant USIM) and the 5G compliant ME is not clear in 3GPP specifications.

In case non-5G compliant USIM is equipped into the 5G ME, the 5G specific services may be provided to users by storing all newly introduced 5G specific parameters in the ME. However, with this use case there could be a security concern as the ME is not considered as an anti-tampered equipment. If the ME is attacked for example by a spyware application in the ME, the UE can be hijacked. This can be considered as security hole in 5GS.

In this case, a UE can comprise a 5G Mobile Equipment and an UICC containing a USIM which does not have a 5G specific DF (e.g. Rel-14 or earlier UICC) and as EFIMSI. In this configuration, the parameters (Home Network Public key, Home Network Public Key ID, and Protection Scheme ID) to conceal SUPI are stored in the ME. FIG. 8 illustrates the UE configuration of this use case.

In view of the problems described above, the present disclosure aims to provide a solution to solve at least one of the various problems.

Solution to Problem

In a first aspect of the present disclosure, a method for a user equipment, UE, which includes a mobile equipment, ME, and a subscriber identity module, SIM, is provided, wherein the method comprises: checking whether the ME and the SIM have a 5th generation, 5G, specific parameter or not, and sending, to a network node, NN, a first message containing a first information element, IE, indicating whether the UE has a valid 5G specific parameter or not, so as to fetch a 5G specific parameter value from a unified data management, UDM.

DESCRIPTION OF EMBODIMENTS

Abbreviations

Figure 1:
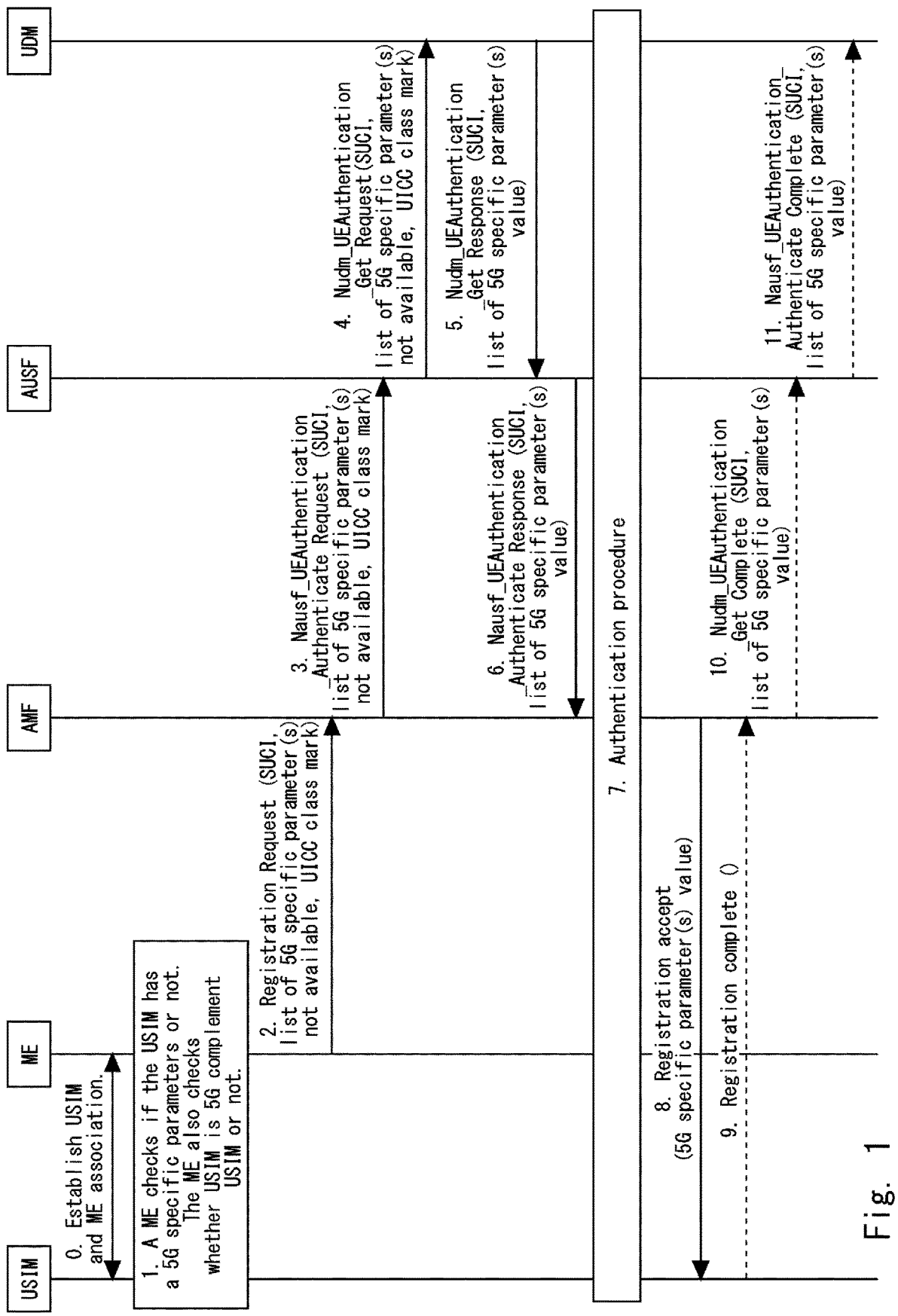
FIG. 1 is a flow chart showing a signalling flow of a method according to a first embodiment of the present disclosure.

For the purposes of the present document, the abbreviations given in 3GPP TR 21.905 (NPL 1) and the following apply. An abbreviation defined in the present document takes precedence over the definition of the same abbreviation, if any, in 3GPP TR 21.905 (NPL 1).

5GC 5G Core Network
5GS 5G System
5G-AN 5G Access Network
5G-GUTI 5G Globally Unique Temporary Identifier
5G S-TMSI 5G S-Temporary Mobile Subscription Identifier
5QI 5G QOS Identifier
AF Application Function
AMF Access and Mobility Management Function
AN Access Node
AS Access Stratum
AUSF Authentication Server Function
CM Connection Management
CP Control Plane
CSFB Circuit Switched (CS) Fallback
DL Downlink
DN Data Network
DNAI DN Access Identifier
DNN Data Network Name
EDT Early Data Transmission
EPS Evolved Packet System
EPC Evolved Packet Core
FQDN Fully Qualified Domain Name
GFBR Guaranteed Flow Bit Rate
GMLC Gateway Mobile Location Centre
GPSI Generic Public Subscription Identifier
GUAMI Globally Unique AMF Identifier
HR Home Routed (roaming)
I-RNTI I-Radio Network Temporary Identifier
LADN Local Area Data Network
LBO Local Break Out (roaming)
LMF Location Management Function
LRF Location Retrieval Function
MAC Medium Access Control
MFBR Maximum Flow Bit Rate
MICO Mobile Initiated Connection Only
MME Mobility Management Entity
N3IWF Non-3GPP Inter Working Function
NAI Network Access Identifier
NAS Non-Access Stratum
NEF Network Exposure Function
NF Network Function
NG-RAN Next Generation Radio Access Network
NR New Radio
NRF Network Repository Function
NSI ID Network Slice Instance Identifier
NSSAI Network Slice Selection Assistance Information
NSSF Network Slice Selection Function
NSSP Network Slice Selection Policy
NWDAF Network Data Analytics Function
PCF Policy Control Function
PEI Permanent Equipment Identifier
PER Packet Error Rate
PFD Packet Flow Description
PLMN Public land mobile network
PPD Paging Policy Differentiation
PPI Paging Policy Indicator
PSA PDU Session Anchor
QFI QoS Flow Identifier
QOE Quality of Experience
(R)AN (Radio) Access Network
RLC Radio Link Control
RM Registration Management
RQA Reflective QoS Attribute
RQI Reflective QoS Indication
RRC Radio Resource Control
SA NR Standalone New Radio
SBA Service Based Architecture
SBI Service Based Interface
SD Slice Differentiator
SDAP Service Data Adaptation Protocol
SEAF Security Anchor Functionality
SEPP Security Edge Protection Proxy
SMF Session Management Function
S-NSSAI Single Network Slice Selection Assistance Information
SSC Session and Service Continuity
SST Slice/Service Type
SUCI Subscription Concealed Identifier
SUPI Subscription Permanent Identifier
UAC Unified Access Control
UDSF Unstructured Data Storage Function
UL Uplink
UL CL Uplink Classifier
UPF User Plane Function
UDR Unified Data Repository
URSP UE Route Selection Policy
SMS Short Message Service
SMSF SMS Function
MT Mobile Terminated
UAC Unified Access Control
ODACD Operator Defined Access Category Definitions
OS Operating System
MO Mobile Originated
MT Mobile Terminated
USIM Universal Subscriber Identity Module
UICC Universal integrated circuit card
SIB System Information Block
MF Master File
DF Dedicated File
EF Elementary File Definitions For the purposes of the present document, the terms and definitions given in 3GPP TR 21.905 (NPL 1) and the following apply. A term defined in the present document takes precedence over the definition of the same term, if any, in 3GPP TR 21.905 (NPL 1).

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

It is to be noted, however, that the reference numerals in claims illustrate only typical embodiments of the present subject matter, and are therefore, not to be considered for limiting of its scope, for the subject matter may admit to other equally effective embodiments.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

First Embodiment (Solution 1)

The solution 1 discloses the procedure to install 5G security parameters to either the USIM or ME (Mobile Equipment). The USIM can be 5G compliant USIM or non-5G complement USIM, for example USIM that is defined in 3GPP Release 14.

FIG. 1 shows the signaling flow of the solution 1.

The detailed steps of solution 1 is given below.

0. An association has been made between a USIM and a 5G ME. This can occur by inserting new SIM card to the 5G ME, SIM card swap or if a UICC may be updated by the OTA, Over-The-Air, technology. In addition, this can also occur in a situation where one UICC contains multiple USIMs and the ME can swap between them. The USIM may have a 5G specific parameter or may be vacant.

A USIM is activated in the 5G ME and the USIM indicates, to the 5G ME, list of service(s) supported by the USIM.

1. The ME checks if the USIM and the ME has a 5G specific parameter respectively or not. If both of the ME and the USIM have at least one set of 5G specific parameter, the set of 5G parameter can be considered as the valid parameters.

If there are two sets of 5G specific parameter and if the one of the two sets is in the USIM and the other one is in the ME, the set of 5G Specific parameter in the USIM overrides the set of 5G parameter in the ME and is considered as a valid parameters. Or the set of 5G Specific parameter in the ME overrides the set of 5G parameter in the USIM and is considered as a valid parameters.

The ME also checks the list of service(s) supported by the USIM. This list can be used to structure a UICC class mark parameter that can be set in the NAS messages.

In one example, the USIM is inserted in a brand new 5G ME (i.e. the 5G ME being used for first time or 5G ME after performing factory reset procedure on the 5G ME).

In one example, the 5G ME identifies if the ME has a 5G specific parameter stored for the USIM by checking whether the ME has stored any 5G specific parameter(s) for the SUPI (or IMSI) of the USIM or not. SUPI or IMSI uniquely identifies a USIM.

In one example, a 5G specific parameter is a parameter configured in the USIM under DF5GS. In one example, a 5G specific parameter is Protection Scheme Identifier List data object or Home Network Public Key List data object in the $EF_{SUCI\_Calc\_Info}$ (Subscription Concealed Identifier Calculation Information EF). A 5G specific parameters are as defined in another embodiment 1.

2. The UE sends the Registration Request message to the AMF. This message contains an Information Element (IE) indicating whether the UE has a valid 5G specific parameter or not. This IE can be a list of multiple 5G specific parameters. As UEs usually have the valid 5G specific parameters in normal case, this IE can be an optional parameter with negative impression in the NAS layer. This parameter may be called as "Not available 5G specific parameters" or "missing 5G specific parameters".

This message also contains an IE indicating the list of service(s) supported by the USIM. This can be called as the UICC class mark. The UICC class mark can be interpreted, by the 5GC, a location where each 5G specific parameters can be stored in the UE, i.e. either USIM or ME, if the 5G specific parameters are provided to the UE by the 5GC.

3. On receiving a registration request message containing the IEs, the AMF sends, to the AUSF, a message (e.g. Nausf_UEAuthentication_Authenticate Request) containing the received IEs in the registration request message.

In one example, the message sent to the AUSF in the step 3 is an existing message between AMF and AUSF or a new message.

4. The AUSF sends, to the UDM, a message (e.g. Nudm_UEAuthentication_Get Request) including the received IEs in the message as shown in step 3.

In one example, the message to the UDM sent in the step 4 is an existing message between AUSF and UDM or a new message.

5. When the UDM receives the message containing IE indicating that 5G parameter(s) is not available in the UE, then the UDM sends, to the AUSF, a message (e.g. Nudm_UEAuthentication_Get Response) that has a value of the 5G specific parameter(s).

The UDM stores the UICC class mark. The UICC class mark may be used in the UDM to decide 5G specific parameter(s) to be used for the UE. For example, if the 5G specific parameter(s) were stored in the ME, then a value of the 5G specified parameters can be specialized ones. For example, they may be self-contained anti-tampered parameters.

The UDM also uses the UICC class mark to make a decision for a frequent update of 5G specific parameters. For example, if the 5G specific parameter(s) were stored in the ME, then the UDM updates the 5G specified parameters every week.

In one example, the UDM encrypts or integrity protects the parameter.

6. The AUSF sends a message (e.g. Nausf_UEAuthentication_Authenticate Response) to the AMF. The message has a value of the 5G specific parameter(s).

7. A UDM/AUSF may invoke authentication procedure. The value of these 5G specific parameters may be sent during the authentication or security command mode procedure.

8. The AMF sends the Registration accept message containing the value of the IE(s). On receiving the registration accept message containing the second IE(s), the UE stores these parameters in either a ME memory or a USIM memory.

In one example, the received 5G specific parameters are stored to the ME in secured way so that any application or function not related to these parameters cannot access or alter the value of the parameters.

In one example, the 5G specific parameter value(s) can be transferred from the UDM to the UE in secured way by a mechanism as described in the TS 33.501 (NPL 9). A security mechanism can be for example a mechanism to secure the message between the UDM and the UE for the Steering of Roaming function.

In one example, if this parameter(s) is encrypted or ciphered, then the ME sends this parameter to the USIM and USIM decrypts or performs integrity protection of this parameter (s) and, after successful integrity check or decryption, sends to the ME. The ME stores the parameter (i.e. SUPI or IMSI) into the ME memory for the USIM.

The UE uses these parameters in any subsequent NAS or AS procedure for the USIM.

9. The UE may send the registration complete message to the AMF if the Registration accept message contained the 5G specific parameters.

10. The AMF may send a message to the AUSF if the AMF received the registration complete message acknowledging the successful reception of the list of the 5G specific parameter value by the UE.

11. The AUSF may send a message to the UDM if the AUSF received, in step 10, the message acknowledging the successful reception of the list of the 5G specific parameter value by the UE.

In one example, the AMF sends list of 5G specific parameter value to the UE in a DL NAS TRANSPORT message or any existing NAS message.

In one example, if the network determines that the UICC containing the USIM is activated in another device by checking the previous association of the USIM (e.g. SUPI or IMSI association) with a previous IMEI and current association of USIM (e.g. SUPI or IMSI association) with the current IMEI and if the previous IMEI and the current IMEI are different, then the network (UDM) sends a 5G specific parameters to the UE in a NAS message as described in this solution 1.

In one example, if the 5G specific parameter Protection Scheme Identifier List data object or Home Network Public Key List data object in the $EF_{SUCI\_Calc\_Info}$ (Subscription Concealed Identifier Calculation Information EF) or both being not configured in the ME and USIM, then the UE indicates to the network in a NAS message (e.g. Registration Request message) that the parameter is not available in the UE and the USIM. When the network receives an indication from the UE that these parameter(s) is not available, then the network sends these parameter(s) to the UE during the registration procedure in Registration accept message or any other existing NAS message or in a new message. When the UE is required to send the SUCI in a NAS message, then the UE uses these parameter(s) to generate a SUCI from the SUPI and sends the SUCI to the network in a NAS message.

In one example, the network may send a NAS message to query the UE whether the UE has a 5G specific parameter configured in the USIM or in the ME memory or whether a USIM service is supported in the EFUST (USIM Service Table). When the UE receives the NAS message, then the UE sends a NAS message indicating the current ME or USIM configuration of the 5G specific parameter or the USIM service received in the NAS message from the network.

In one example, at least one of the step 9-11 described in the above may be mandatory functions for each node respectively (i.e. the UE, the AMF or the AUSF).

Second Embodiment (Solution 2)

The solution 2 discloses the procedure to take a special treatment in case a non-5G compliant USIM is equipped to the UE. For example, a non-5G compliant USIM can be a USIM based on the 3GPP Release 14.

Figure 2:
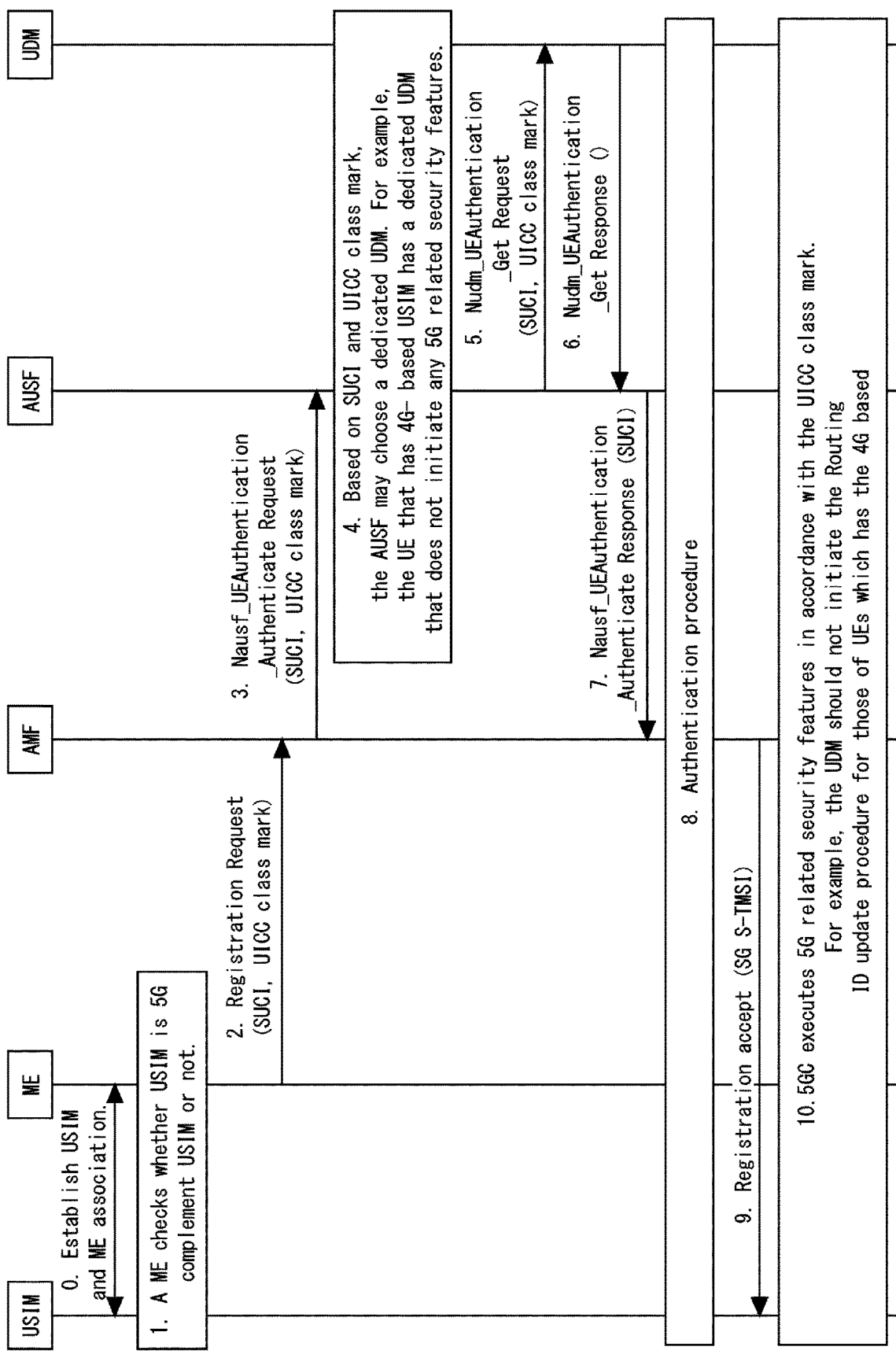
FIG. 2 is a flow chart showing a signalling flow of a method according to a second embodiment of the present disclosure.

FIG. 2 shows the signaling flow of the solution 2.

The detailed steps of solution 2 are defined as below:

0. An association has been made between a USIM and a 5G ME. This can occur by inserting new SIM card to the 5G ME, SIM card swap or if a UICC may be updated by the OTA, Over-The-Air, technology. In addition, this can also occur in a situation where one UICC contains multiple USIMs and the ME can swap between them. The USIM may have a 5G specific parameter or may be vacant.

A USIM is activated in the 5G ME and the USIM indicates, to the 5G ME, list of service(s) supported by the USIM.

In one example, the USIM list of service(s) supported in the USIM is the list of service(s) which are indicated as available in the elementary file EFUST (USIM Service Table). The list is defined in another embodiment 1.

1. The ME checks the list of service(s) supported by the USIM. This list can be used to structure a UICC class mark parameter that can be set in the NAS messages.

In one example, the USIM is inserted in a brand new 5G ME (i.e. the 5G ME being used for first time or 5G ME after performing factory reset procedure on the 5G ME).

In one example, the 5G ME identifies if the ME has a 5G specific parameter stored for the USIM by checking whether the ME has stored any 5G specific parameter(s) for the SUPI (or IMSI) of the USIM or not. SUPI or IMSI uniquely identifies a USIM.

In one example, a 5G specific parameter is a parameter configured in the USIM under DF5GS. In one example, a 5G specific parameter is Protection Scheme Identifier List data object or Home Network Public Key List data object in the $EF_{SUCI\_Calc\_Info}$ (Subscription Concealed Identifier Calculation Information EF). A 5G specific parameter is as defined in another embodiment 1.

2. The UE sends the Registration Request message to the AMF. This message contains an IE indicating the list of service(s) supported by the USIM. This can be called as the UICC class mark. The UICC class mark can be interpreted, by the 5GC, a location where each 5G specific parameters can be stored in the UE, i.e. either USIM or ME, if the 5G specific parameters are provided to the UE by the 5GC.

3. On receiving a registration request message containing the IEs, the AMF sends, to the AUSF, a message (e.g. Nausf_UEAuthentication_Authenticate Request) containing the received IEs in the registration request message.

In one example, the message sent to the UDM is an existing message between AMF and AUSF or a new message.

In one example, the USIM list of service(s) supported in the USIM is the list of service(s) which are indicated as available in the elementary file EFUST (USIM Service Table). The list is defined in another embodiment 1.

4. Based on the SUCI and the list of service(s) supported in the USIM as indicated as the UICC class mark, the AUSF selects a dedicated UDM that is specialised for handling of those UEs that has non-5G compliant USIM. A dedicated UDM can be selected based on a content of the list of service(s) supported in the USIM.

5. The AUSF sends, to the UDM, a message (e.g. Nudm_UEAuthentication_Get Request) including the received IEs in the message as shown in step 3.

6. The UDM sends a message (e.g. Nudm_UEAuthentication_Get Response) to the AUSF.

7. The AUSF sends a message (e.g. Nausf_UEAuthentication_Authenticate Response) to the AMF.

8. A UDM/AUSF may invoke authentication procedure.

9. The AMF sends the Registration accept message to the UE.

10. 5GC executes 5G related features in accordance with the list of service(s) supported by the USIM. For example, the UDM should not initiate the Routing ID update procedure for those of UEs that does not support 5G specific parameters.

In one example, if the list of service(s) supported indicates that the USIM does not have support of 5G specific parameter(s), then the UDM does not initiate 5G specific operation(s) (Example, the UDM does not initiate any 5G specific security operation).

In one example, when the UE does not send the list of supported service(s) in the USIM to the AMF, then the AMF or any network node (e.g. UDM) queries the service(s) supported by the USIM to the UE and in response, the UE sends the list of service(s) supported by the USIM. In this case, the AMF sends a NAS message requesting the UE to send a list of service(s) supported by the USIM. In response, the UE sends the list of service(s) supported by the USIM.

In one example, the UE may send a list of service(s) not supported in the EFUST (USIM Service Table) to the network. On receiving this list, the network may not execute the operation related to these services.

Another Embodiment 1

This another embodiment discloses the Contents of files in the Universal Subscriber Identity Module (USIM) application as described in the 3GPP TS 31.102 (NPL 7). This embodiment 1 shows some relevant Contents of files in the USIM to the present document.

Figure 6:
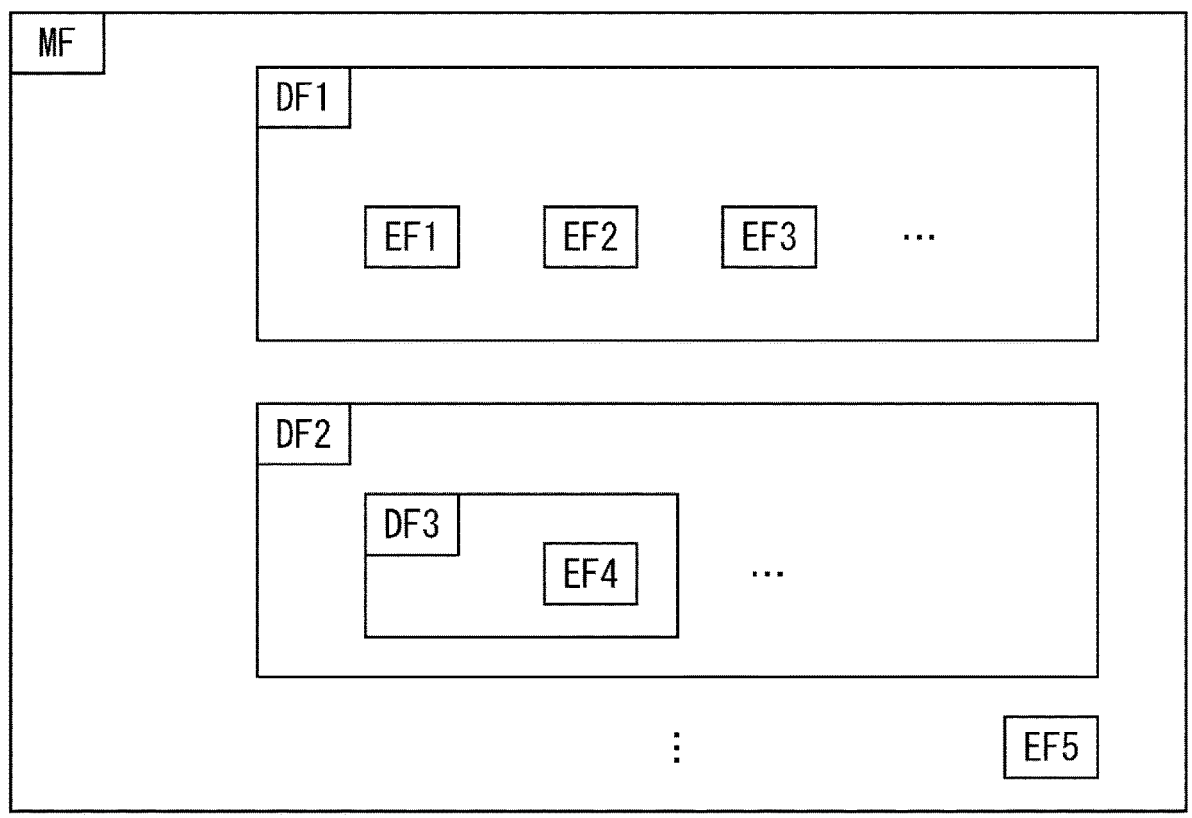
FIG. 6 is a diagram showing a file structure in USIM.
Figure 7:
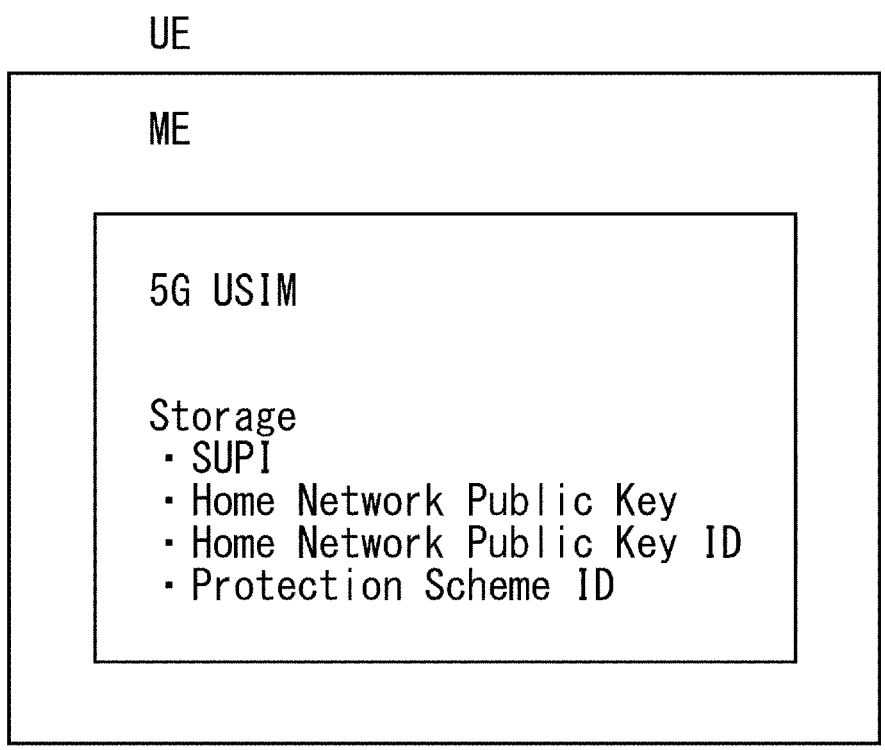
FIG. 7 is a diagram showing a configuration example of a UE.
Figure 8:
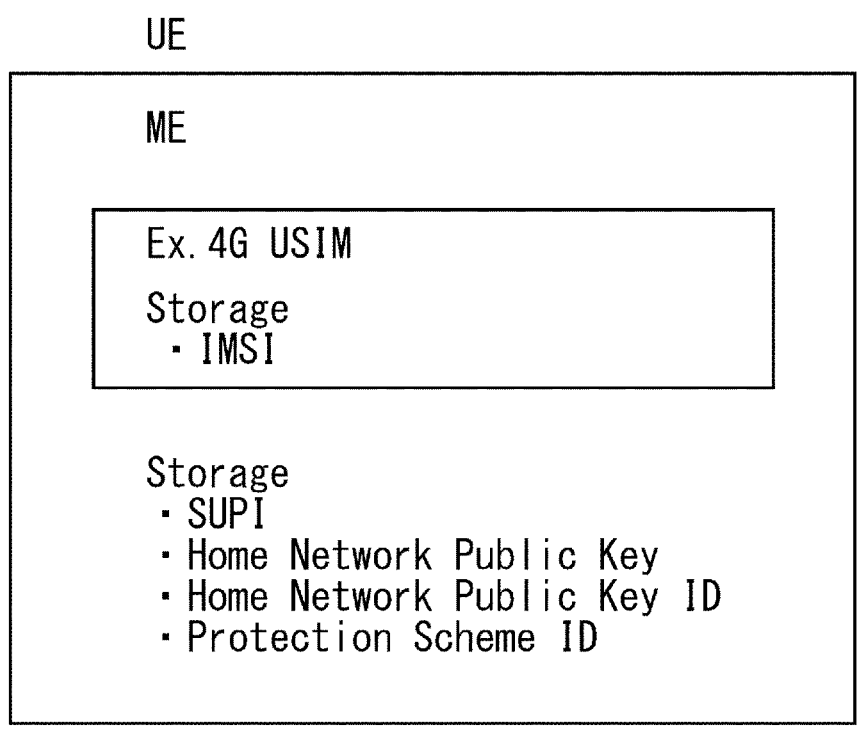
FIG. 8 is a diagram showing a configuration example of a UE.

Here, data stored in the USIM may have a hierarchical file structure as shown in FIG. 6.

As shown in FIG. 6, MF (Master File) contains at least one DF (Dedicated File) (e.g. DF1). The MF may directly contains EF (Elementary File) (e.g. EF5). The DF may be $DF_{GSM}$ or $DF_{TELECOM}$. The DF may include at least one EF (e.g. EF1). Furthermore, the DF may also include further DF (e.g. DF3).

Hereinafter, examples of contents and coding methods for EFs are described in this embodiment, as the above-mentioned "5G specific parameter". Therefore, the above-mentioned "5G specific parameter" may be any EF and any information (e.g. service information (e.g. service n xxx), location information (e.g. Tracking Area Identity), identifier (e.g. 5G-GUTI, SUCI, Protection Scheme Identifier), context information, Key information (e.g. Key Index), Tag information, configuration information SUCI calculation information) described in the following examples.

1. $EF_{UST}$ (USIM Service Table)

This EF (Elementary File) indicates which services are available. If a service is not indicated as available in the USIM, the ME shall not select this service. The following table indicates one example of USIM Service Table in $EF_{UST}$.

| Identifier: '6F38' | Structure: transparent | | Mandatory |
|---|---|---|---|
| SFI: '04' | | | |
| File size: X bytes, (X ≥ 1) | | Update activity: low | |
| Access Conditions: | | | |
| READ | PIN | | |
| UPDATE | ADM | | |
| DEACTIVATE | ADM | | |
| ACTIVATE | ADM | | |

| Bytes | Description | M/O | Length |
|---|---|---|---|
| 1 | Services n 1 to n 8 | M | 1 byte |
| 2 | Services n 9 to n 16 | O | 1 byte |
| 3 | Services n 17 to n 24 | O | 1 byte |
| 4 | Services n 25 to n 32 | O | 1 byte |
| etc. | | | |
| X | Services n (8X − 7) to n (8X) | O | 1 byte |

Here, services indicated by the EF may be defined as the following table.

| Services Contents: | Service n 1: | Local Phone Book |
|---|---|---|
| | Service n 2: | Fixed Dialling Numbers (FDN) |
| | Service n 3: | Extension 2 |

-continued

| | |
|---|---|
| Service n 4 | Service Dialling Numbers (SDN) |
| Service n 5: | Extension3 |
| Service n 6: | Barred Dialling Numbers (BDN) |
| Service n 7: | Extension4 |
| Service n 8: | Outgoing Call Information (OCI and OCT) |
| Service n 9: | Incoming Call Information (ICI and ICT) |
| Service n 10: | Short Message Storage (SMS) |
| Service n 11: | Short Message Status Reports (SMSR) |
| Service n 12: | Short Message Service Parameters (SMSP) |
| Service n 13: | Advice of Charge (AoC) |
| Service n 14: | Capability Configuration Parameters 2 (CCP2) |
| Service n 15: | Cell Broadcast Message Identifier |
| Service n 16: | Cell Broadcast Message Identifier Ranges |
| Service n 17: | Group Identifier Level 1 |
| Service n 18: | Group Identifier Level 2 |
| Service n 19: | Service Provider Name |
| Service n 20: | User controlled PLMN selector with Access Technology |
| Service n 21: | MSISDN |
| Service n 22: | Image (IMG) |
| Service n 23: | Support of Localised Service Areas (SoLSA) |
| Service n 24: | Enhanced Multi-Level Precedence and Pre-emption Service |
| Service n 25: | Automatic Answer for eMLPP |
| Service n 26: | RFU |
| Service n 27: | GSM Access |
| Service n 28: | Data download via SMS-PP |
| Service n 29: | Data download via SMS-CB |
| Service n 30: | Call Control by USIM |
| Service n 31: | MO-SMS Control by USIM |
| Service n 32: | RUN AT COMMAND command |
| Service n 33: | shall be set to '1' |
| Service n 34; | Enabled Services Table |
| Service n 35: | APN Control List (ACL) |
| Service n 36: | Depersonalisation Control Keys |
| Service n 37: | Co-operative Network List |
| Service n 38: | GSM security context |
| Service n 39: | CPBCCH information |
| Service n 40: | Investigation Scan |
| Service n 41: | MexE |
| Service n 42: | Operator controlled PLMN selector with Access Technology |
| Service n 43: | HPLMN selector with Access Technology |
| Service n 44: | Extension 5 |
| Service n 45: | PLMN Network Name |
| Service n 46: | Operator PLMN List |
| Service n 47: | Mailbox Dialling Numbers |
| Service n 48: | Message Waiting indication Status |
| Service n 49: | Call Forwarding Indication Status |
| Service n 50: | Reserved and shall be ignored |
| Service n 51: | Service Provider Display Information |
| Service n 52 | Multimedia Messaging Service (MMS) |
| Service n 53 | Extension 8 |
| Service n 54 | Call control on GPRS by USIM |
| Service n 55 | MMS User Connectivity Parameters |
| Service n 56 | Network's indication of alerting in the MS (NIA) |
| Service n 57 | VGCS Group identifier List ($EF_{VGCS}$ and $EF_{VGCSS}$) |
| Service n 58 | VBS Group Identifier List ($EF_{VBS}$ and $EF_{VBSS}$) |
| Service n 59 | Pseudonym |
| Service n 60 | User Controlled PLMN selector for I-WLAN access |
| Service n 61 | Operator Controlled PLMN selector for I-WLAN access |
| Service n 62 | User controlled WSID list |
| Service n 63 | Operator controlled WSID list |
| Service n 64 | VGCS security |
| Service n 65 | VBS security |
| Service n 66 | WLAN Reauthentication Identity |
| Service n 67 | Multimedia Messages Storage |
| Service n 68 | Generic Bootstrapping Architecture (GBA) |
| Service n 69 | MBMS security |
| Service n 70 | Data download via USSD and USSD application mode |
| Service n 71 | Equivalent HPLMN |
| Service n 72 | Additional TERMINAL PROFILE after UICC activation |
| Service n 73 | Equivalent HPLMN Presentation Indication |
| Service n 74 | Last RPLMN Selection Indication |
| Service n 75 | OMA BCAST Smart Card Profile |
| Service n 76 | GBA-based Local Key Establishment Mechanism |
| Service n 77 | Terminal Applications |
| Service n 78 | Service Provider Name Icon |
| Service n 79 | PLMN Network Name Icon |
| Service n 80 | Connectivity Parameters for USIM IP connections |
| Service n 81 | Home I-WLAN Specific Identifier List |
| Service n 82 | I-WLAN Equivalent HPLMN Presentation Indication |

-continued

| | |
|---|---|
| Service n 83 | I-WLAN HPLMN Priority Indication |
| Service n 84 | I-WLAN Last Registered PLMN |
| Service n 85 | EPS Mobility Management Information |
| Service n 86 | Allowed CSG Lists and corresponding indications |
| Service n 87 | Call control on EPS PDN connection by USIM |
| Service n 88 | HPLMN Direct Access |
| Service n 89 | eCall Data |
| Service n 90 | Operator CSG Lists and corresponding indications |
| Service n 91 | Support for SM-over-IP |
| Service n 92 | Support of CSG Display Control |
| Service n 93 | Communication Control for IMS by USIM |
| Service n 94 | Extended Terminal Applications |
| Service n 95 | Support of UICC access to IMS |
| Service n 96 | Non-Access Stratum configuration by USIM |
| Service n 97 | PWS configuration by USIM |
| Service n 98 | RFU |
| Service n 99 | URI support by UICC |
| Service n 100 | Extended EARFCN support |
| Service n 101 | ProSe |
| Service n 102 | USAT Application Pairing |
| Service n 103 | Media Type support |
| Service n 104 | IMS call disconnection cause |
| Service n 105 | URI support for MO SHORT MESSAGE CONTROL |
| Service n 106 | ePDG configuration Information support |
| Service n 107 | ePDG configuration Information configured |
| Service n 108 | ACDC support |
| Service n 109 | Mission Critical Services |
| Service n 110 | ePDG configuration information for Emergency Service support |
| Service n 111 | ePDG configuration information for Emergency Service configured |
| Service n 112 | eCall Data over IMS |
| Service n 113 | URI support for SMS-PP DOWNLOAD as defined n 3GPP TS 31.111 [12] |
| Service n 114 | From Preferred |
| Service n 115 | IMS configuration data |
| Service n 116 | TV configuration |
| Service n 117 | 3GPP PS Data Off |
| Service n 118 | 3GPP PS Data Off Service List |
| Service n 119 | V2X |
| Service n 120 | XCAP Configuration Data |
| Service n 121 | EARFCN list for MTC/NE-IOT UEs |
| Service n 122 | 5GS Mobility Management Information |
| Service n 123 | 5G Security Parameters |
| Service n 1.24 | Subscription Identifier privacy support |
| Service n 125 | SUCI calculation by the USIM |
| Service n 126 | DAC Access Identities support |
| Service n 127 | Expect control plane-based Steering of Roaming information during initial registration in VPLMN |
| Service n 128 | Call control on PDU Session by USIM |

The EF contains at least one byte. Further bytes may be included, but if the EF includes an optional byte, then it is mandatory for the EF to also contain all bytes before that byte. Other services are possible in the future and will be coded on further bytes in the EF. The coding falls under the responsibility of the 3GPP.

Here, Service n 46 can only be declared "available" if service n 45 is declared "available".

Service n 95, n 99 and n 115 shall not be declared "available" if an ISIM application is present on the UICC.

Service n 125 shall only be taken into account if Service n xxx is declared "available". If Service n 124 and Service n 125 are declared "available", the "SUCI calculation is to be performed by the USIM". If Service n 124 is declared "available" and Service n 125 is not declared "available", the "SUCI calculation is to be performed by the ME".

Coding:
   1 bit is used to code each service:
      bit = 1: service available;
      bit = 0: service not available.

Service available means that the USIM has the capability to support the service and that the service is available for the user of the USIM unless the service is identified as "disabled" in $EF_{EST}$.

Service not available means that the service shall not be used by the USIM user, even if the USIM has the capability to support the service.

Figure 9:
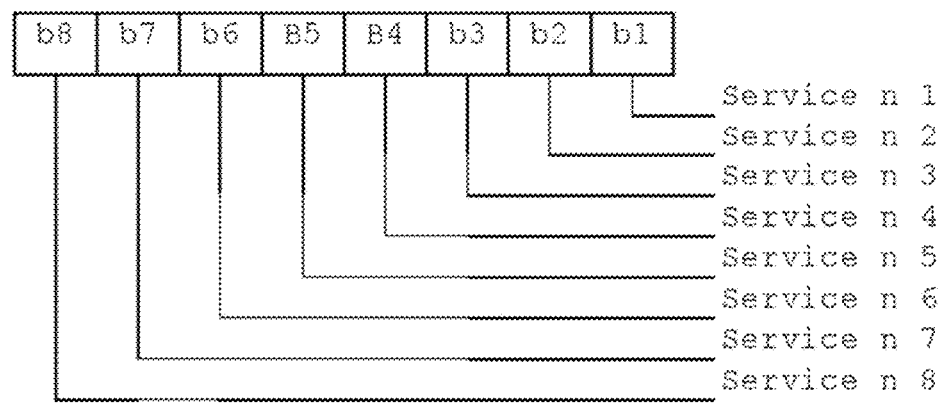
FIG. 9 is a diagram showing a First byte and a Second byte according to one or more example embodiments.
Figure 9:
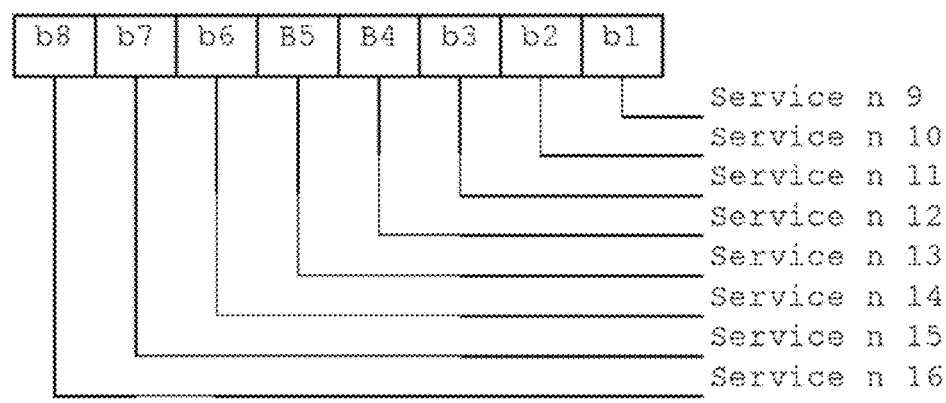

FIG. 9 is a diagram showing a First byte and a Second byte according to one or more example embodiments.

2 Contents of Files at the $DF_{5GS}$ Level 2.1 Introduction

This clause describes the files that are specific for 5GS.

$DF_{5GS}$ shall be present at the ADF (Application Dedicated File) USIM level if any of the following services are "available" in $EF_{UST}$ (USIM Service Table):

| | |
|---|---|
| Service n 122 | 5GS Mobility Management Information |
| Service n 123 | 5G Security Parameters |
| Service n 124 | Subscription identifier privacy support |
| Service n 125 | SUCI calculation by the USN |

-continued

| | |
|---|---|
| Service n 126 | UAC Access Identities support |
| Service n 127 | Steering of UE in VPLMN |

2.2 $EF_{5GS3GPPLOCI}$ (5GS 3GPP location information)

If service n 122 is "available" in $EF_{UST}$, this file shall be present.

This EF contains the following 5GS location information for 3GPP access:

5G-Globally Unique Temporary Identifier (5G-GUTI);
Last visited registered Tracking Area Identity in 5GS (TAI);
5GS update status.

The following table indicates one example of 5GS 3GPP location information in $EF_{5GS3GPPLOCI}$.

| Identifier: '4F01' | Structure: transparent | | Optional |
|---|---|---|---|
| SFI: '01' | | | |
| File size: 19 bytes | | Update activity: high | |
| Access Conditions: | | | |
| READ | | PIN | |
| UPDATE | | PIN | |
| DEACTIVATE | | ADM | |
| ACTIVATE | | ADM | |

| Bytes | Description | M/O | Length |
|---|---|---|---|
| 1 to 12 | 5G-GUTI for 3GPP access | M | 12 bytes |
| 13 to 18 | Last visited registered TAI in 5GS for 3GPP access | M | 6 bytes |
| 19 | 5GS updated status for 3GPP access | M | 1 byte |

5G-GUTI for 3GPP access.
Contents:
5G-Globally Unique Temporary Identifier for 3GPP access.
Coding:
as the 5G-GUTI part of the 5GS mobile identity information element defined in TS 24.501 (NPL 4). Byte 1 corresponds to "octet 2" of a 5GS mobile identity information element containing a 5G-GUTI. Byte 12 corresponds to "octet 13" of a 5GS mobile identity information element information element containing a 5G-GUTI.

Figure 10:
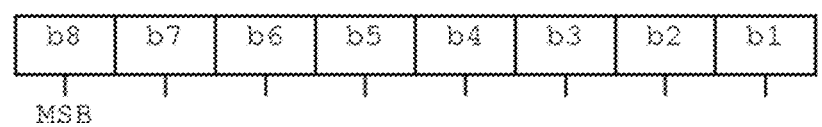
FIG. 10 is a diagram showing a first byte of 5G-GUTI for 3GPP access according to one or more example embodiments.

FIG. 10 is a diagram showing a first byte of 5G-GUTI for 3GPP access according to one or more example embodiments.

Last visited registered TAI in 5GS for 3GPP access
Contents:
Last visited registered Tracking Area Identity in 5GS for 3GPP access.
Coding:
as the content of the tracking area identity information element defined in TS 24.501 (NPL 4). Byte 13 corresponds to "octet 2" of a tracking area identity information element. Byte 18 corresponds to "octet 7" of a tracking area identity information element.

Figure 11:
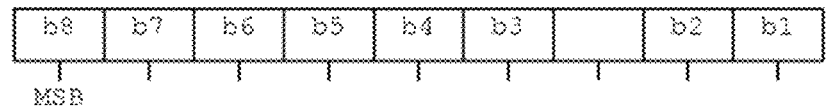
FIG. 11 is a diagram showing a first byte of last visited registered TAI for 3GPP access according to one or more example embodiments.

FIG. 11 is a diagram showing a first byte of last visited registered TAI for 3GPP access according to one or more example embodiments.

5GS update status for 3GPP access.
Contents:
status of 5GS update for 3GPP access according to TS 24.501 (NPL 4).

Coding:
byte 19:

| Bits: | b3 | b2 | b1. | |
|---|---|---|---|---|
| | 0 | 0 | 0 | 5U1 UPDATED, |
| | 0 | 0 | 1 | 5U2 NOT UPDATED. |
| | 0 | 1 | 0 | 5U3 ROAMING NOT ALLOWED. |
| | 0 | 1 | 1 | reserved. |
| | 1 | 0 | 0 | reserved. |
| | 1 | 0 | 1 | reserved. |
| | 1 | 1 | 0 | reserved. |
| | 1 | 1 | 1 | reserved. |

Bits b4 to b8 are RFU (see TS 31.101 [8]).
Unused bytes may be set to 'FF'.

2.3 $EF_{5GSN3GPPLOCI}$ (5GS non-3GPP location information)

If service n 122 is "available" in $EF_{UST}$, this file shall be present.

This EF contains the following 5GS location information for non-3GPP access:

5G-Globally Unique Temporary Identifier (5G-GUTI);
Last visited registered Tracking Area Identity in 5GS (TAI);
5GS update status.

The following table indicates one example of 5GS non-3GPP location information in $EF_{5GSN3GPPLOCI}$.

| Identifier: '4F02' | Structure: transparent | | Optional |
|---|---|---|---|
| SFI: '02' | | | |
| File size: 19 bytes | | Update activity: high | |
| Access Conditions: | | | |
| READ | | PIN | |
| UPDATE | | PIN | |
| DEACTIVATE | | ADM | |
| ACTIVATE | | ADM | |

| Bytes | Description | M/O | Length |
|---|---|---|---|
| 1 to 12 | 5G-GUTI for non-3GPP access | M | 12 bytes |
| 13 to 18 | Last visited registered TAI in 5GS for non-3GPP access | M | 6 bytes |
| 19 | 5GS updated status for non-3GPP access | M | 1 byte |

2.4 $EF_{5GS3GPPNSC}$ (5GS 3GPP Access NAS Security Context)

If service n 122 is "available" in $EF_{UST}$, this file shall be present.

This EF contains the 5GS 3GPP access NAS security context as defined in TS 24.501 (NPL 4), consisting of $K_{AMF}$ with the associated key set identifier, the UE security capabilities, and the uplink and downlink NAS COUNT values. This file contains one record.

The following table indicates one example of 5GS 3GPP Access NAS Security Context in $EF_{5GS3GPPNSC}$.

| Identifier: '4F03' | Structure: linear fixed | | Optional |
|---|---|---|---|
| SFI: '03' | | | |
| File size: X bytes (X ≥ 54) | | Update activity: high | |
| Access Conditions: | | | |
| READ | | PIN | |
| UPDATE | | PIN | |
| DEACTIVATE | | ADM | |
| ACTIVATE | | ADM | |

-continued

| Bytes | Description | M/O | Length |
|---|---|---|---|
| 1 to X | 5GS NAS Security Context TLV Object | M | X bytes |

5GS NAS Security Context Tags

| Description | Tag Value |
|---|---|
| 5GS NAS Security Context Tag | 'A0' |

5GS NAS Security Context Information

| Description | Value | M/O | Length (bytes) |
|---|---|---|---|
| 5GS NAS Security Context Tag | 'A0' | M | 1 |
| Length (length of all subsequent data) | Y | M | Note 1 |
| ngKSI Tag | '80' | M | 1 |
| Length | K | M | Note 1 |
| ngKSI | — | M | K |
| $K_{AMF}$ Tag | '81' | M | 1 |
| Length | L | M | Note 1 |
| $K_{AMF}$ | — | M | L |
| Uplink NAS count Tag | '82' | M | 1 |
| Length | M | M | Note 1 |
| Uplink NAS count | — | M | M |
| Downlink NAS count Tag | '83' | M | 1 |
| Length | N | M | Note 1 |
| Downlink NAS count | — | M | N |
| Identifiers of selected NAS integrity and encryption algorithms Tag | '84' | M | 1 |
| Length | S | M | Note 1 |
| Identifiers of selected NAS integrity and encryption algorthms | — | M | S |

Note 1:
The length is coded according to ISO/IEC 8825-1 [35]

ngKSI Tag '80'
Contents:

The ngKSI (Key Set Identifier in 5G) as defined in TS 33.501 (NPL 9) is coded on 1 byte.

Figure 12:
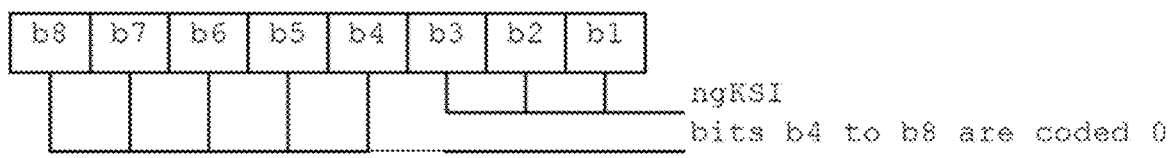
FIG. 12 is a diagram showing coding of the ngKSI according to one or more example embodiments.

FIG. 12 is a diagram showing coding of the ngKSI according to one or more example embodiments $K_{AMF}$ Tag '81'
Contents:

The $K_{AMF}$ as defined in TS 33.501 (NPL 9) is coded on 32 bytes. The ME shall treat any $K_{AMF}$ values stored in this EF as invalid if the ngKSI indicates that no $K_{AMF}$ is available or if the length indicated in the $K_{AMF}$ TLV is set to '00',
Coding:

The most significant bit of $K_{AMF}$ is the most significant bit of the 1$^{st}$ byte of this TLV value field. The least significant bit of KAMP is the least significant bit of the last byte of this TLV value field.

Uplink NAS Count Tag '82'
Contents:

The uplink NAS count as defined in TS 33.501 (NPL 9) is coded on 4 bytes.
Coding:

The most significant bit of the uplink NAS count is the most significant bit of the 1$^{st}$ byte of this TLV value field. The least significant bit of the uplink NAS count is the least significant bit of the last byte of this TLV value field.

Downlink NAS count Tag '83'
Contents:

The downlink NAS count as defined in TS 33.501 (NPL 9) is coded on 4 bytes.
Coding:

The most significant bit of the downlink NAS count is the most significant bit of the 1$^{st}$ byte of this TLV value field. The least significant bit of the downlink NAS count is the least significant bit of the last byte of this TLV value field.

Identifiers of selected NAS integrity and encryption algorithms Tag '84'
Contents:

The identifiers of selected NAS integrity and encryption algorithms as defined in TS 33.501 (NPL 9) and TS 24.501 (NPL 4). In this release the identifiers of selected NAS integrity and encryption algorithms are coded as 4-bit identifiers.
Coding:

Coding is same as the content of the NAS security algorithms information element defined in TS 24.501 (NPL 4).

Figure 13:
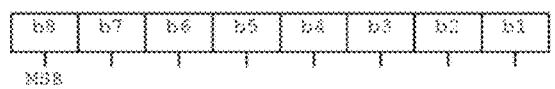
FIG. 13 is a diagram showing coding of the NAS security algorithms information element according to one or more example embodiments.

FIG. 13 is a diagram showing coding of the NAS security algorithms information element according to one or more example embodiments.

Unused bytes shall be set to 'FF'.

In order to mark the stored 5GS NAS security context as invalid:

the record bytes shall be set to 'FF', or the ngKSI is set to '07', or the length indicated in the $K_{AMF}$ TLV is set to '00'.

2.5 $EF_{5GSN3GPPNSC}$ (5GS Non-3GPP Access NAS Security Context)

If Service n 122 is "available" in $EF_{UST}$, this file shall be present. This EF contains the 5GS non-3GPP access NAS security context as defined in TS 24.501 (NPL 4), consisting of $K_{AMF}$ with the associated key set identifier, the UE security capabilities, and the uplink and downlink NAS COUNT values. This file contains one record.

The following table indicates one example of 5GS non-3GPP Access NAS Security Context in $EF_{5GSN3GPPNSC}$.

| Identifier: '4F04' | | Structure: linear fixed | Optional |
|---|---|---|---|
| SFI: '04' | | | |
| File size: X bytes (X ≥ 54) | | Update activity: high | |
| Access Conditions: | | | |
| READ | | PIN | |
| UPDATE | | PIN | |
| DEACTIVATE | | ADM | |
| ACTIVATE | | ADM | |

| Bytes | Description | M/O | Length |
|---|---|---|---|
| 1 to X | 5GS NAS Security Context TLV Object | M | X bytes |

2.6 $EF_{5GAUTHKEYS}$ (5G Authentication Keys)

If Service n 123 is "available" in $EF_{UST}$, this file shall be present.

This EF contains KAUSF and KSEAF that are generated on the ME using CK and IK as part of AKA procedures as described in TS 33.501 (NPL 9).

The following table indicates one example of 5G authentication keys in $EF_{5GAUTHKEYS}$.

| Identifier: '4F05' SFI: '05' File size: >= 68 bytes Access Conditions: | Structure: transparent Update activity: high | | Optional |
|---|---|---|---|
| READ | PIN | | |
| UPDATE | PIN | | |
| DEACTIVATE | ADM | | |
| ACTIVATE | ADM | | |
| Description | Value | M/O | Length |
| $K_{AUSF}$ Tag | '80' | M | 1 |
| Length | K (Note2) | M | Note1 |
| $K_{AUSF}$ | — | M | K (Note2) |
| $K_{SEAF}$ Tag | '81' | M | 1 |
| Length | L (Note2) | M | Note 1 |
| $K_{SEAF}$ | — | M | L (Note2) |

Note 1:
The length is coded according to ISO/IEC 8825-1 [35]
Note 2:
As per TS 33.501 [105], the length of keys $K_{AUSF}$ and $K_{SEAF}$ is 32 bytes each KAUSF Tag '80'.
Contents:
  KAUSF as described in TS 33.501 (NPL 9)).
Coding:
  The most significant bit of KAUSF is the most significant bit of the 1st byte of this TLV value field. The least significant bit of KAUSF is the least significant bit of the last byte of this TLV value field.
KSEAF Tag '81'.
Contents:
  KSEAF as described in TS 33.501 (NPL 9)).
Coding:
  The most significant bit of KSEAF is the most significant bit of the 1st byte of this TLV value field. The least significant bit of KSEAF is the least significant bit of the last byte of this TLV value field.

2.7 $EF_{UAC\_AIC}$ (UAC Access Identities Configuration)

If service n 126 is "available" in $EF_{UST}$, this file shall be present.

This EF contains the configuration information pertaining to access identities allocated for specific high priority services that can be used by the subscriber. The assigned access identities are used, in combination with an access category, to control the access attempts. For more information see TS 22.261 (NPL 10) and TS 24.501 (NPL 4).

The following table indicates one example of UAC Access Identities Configuration in $EF_{UAC\_AIC}$.

| Identifier: '4F06' SFI: '06' File size: 4 bytes Access Conditions: | Structure: transparent Update activity: low | | Optional |
|---|---|---|---|
| READ | PIN | | |
| UPDATE | ADM | | |
| DEACTIVATE | ADM | | |
| ACTIVATE | ADM | | |
| Bytes | Description | M/O | Length |
| 1 to 4 | UAC access identities configuration | M | 4 bytes |

UAC access identities configuration

Contents:
  Configuration of certain Unified Access Control (UAC) access identities specified in TS 24.501 (NPL 4) subclause 4.5.2.

Figure 14:
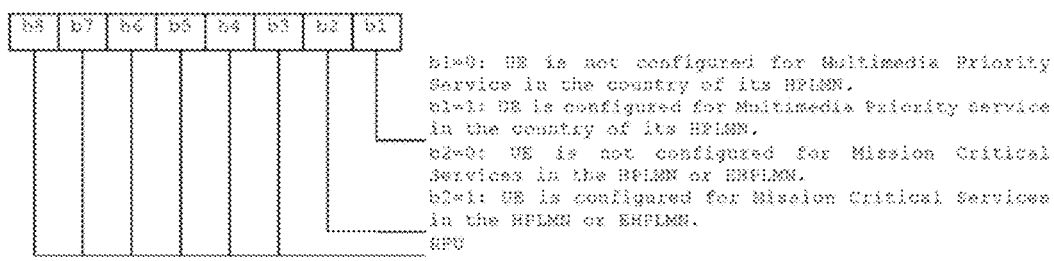
FIG. 14 is a diagram showing coding of each access identity configuration on one bit according to one or more example embodiments.

FIG. 14 is a diagram showing coding of each access identity configuration on one bit according to one or more example embodiments.

Bytes 2 to 4:
Bits b1 to b8 are RFU.
NOTE: Access Identities 11 to 15 (as specified in TS 24.501 (NPL 4)) are configured as Access Classes 11 to 15 in $EF_{ACC}$, specified in clause 4.2.15.

2.8 $EF_{SUCI\_Calc\_Info}$ (Subscription Concealed Identifier Calculation Information EF)

If "SUCI calculation is to be performed by the ME" (i.e. service n 124 is "available" in $EF_{UST}$ and service n 125 is not "available" in $EF_{UST}$), this file shall be present.

If "SUCI calculation is to be performed by the USIM" (i.e. service n 124 is "available" in $EF_{UST}$ and service n 125 is "available" in $EF_{UST}$), this file shall not be available to the ME.

If service n 124 is not "available" in $EF_{UST}$, this file shall not be available to the ME. This EF contains information needed by the ME for the support of subscription identifier privacy as defined in 3GPP TS 33.501 (NPL 9).

The following table indicates one example of Subscription Concealed Identifier Calculation Information in $EF_{SUCI\_Calc\_Info}$.

| Identifier: '4F07' SFI: '07' File size: X bytes (X ≥ 2) Access Conditions: | Structure: transparent Update activity: low | | Optional |
|---|---|---|---|
| READ | PIN | | |
| UPDATE | ADM | | |
| DEACTIVATE | ADM | | |
| ACTIVATE | ADM | | |
| Bytes | Description | M/O | Length |
| 1 to Z | Protection Scheme Identifier List data object | M | Z bytes |
| Z + 1 to Y + Z | Home Network Public Key List data object | O | Y bytes |
| X-W +1 to X | Routing Information TLV data object | O | W bytes |

Editor's Note:
The presence condition of Routing information TLV data object is FFS.

Protection Scheme Identifier List data object.
Contents:
  This data object shall always be present. If Protection Scheme Identifier List data object length is not zero, this data object contains a list of the Protection Scheme Identifier and the corresponding Key Index. The first Protection Scheme Identifier entry has the highest priority and the last Protection Scheme Identifier entry has the lowest priority. The Key Index value indicates the position of the Home Network Public Key in the Home Network Public Key List, that is applicable to the Protection Scheme.

Coding:

| Description | Value | M/O/C | Length (bytes) |
|---|---|---|---|
| Protection Scheme Identifier List data object tag | 'A0' | M | 1 |
| Protection Scheme Identifier List data object length | L1 | M | Note 1 |
| Protection Scheme Identifier 1 (Highest priority) | — | O | 1 |
| Key index 1 | — | C (Note 2) | 1 |
| Protection Scheme Identifier 2 | — | O | 1 |
| Key index 2 | — | C (Note 2) | 1 |
| ... | ... | ... | ... |
| Protection Scheme Identifier N (Lowest priority) | — | O | 1 |
| Key index N | — | C (Note 2) | 1 |

Figure 15:
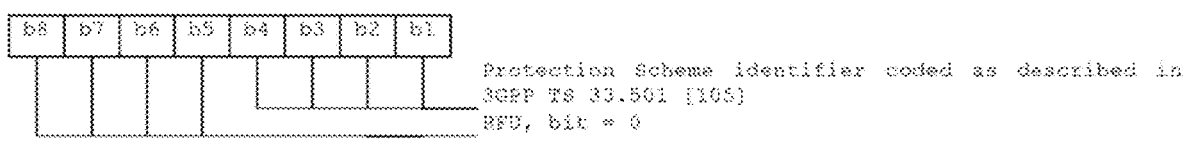
FIG. 15 is a diagram showing coding of the Protection Scheme Identifier according to one or more example embodiments.

Note 1:
The length is coded according to ISO/IEC 8825-1 [35]
Note 2:
This field is present only if the corresponding Protection Scheme Identifier field is present The Protection Scheme Identifier represents a protection scheme as described in 3GPP TS 33.501 (NPL 9) and it is coded in one byte as shown in FIG. 15, according to one or more example embodiments.

Editor's Note: The format may need to be updated depending on the outcome of 3GPP TS 23.003 (NPL 11).

The Key Index is coded in one byte such that its value indicates the position of the Home Network Public Key in the Home Network Public Key List data object, that is applicable to the Protection Scheme. A Key Index with a value of "1" refers to the first Network Public Key entry in the Home Network Public Key List, and so on. A Key Index with a value of "0" indicates that there is no Home Network Public Key associated with that Protection Scheme (e.g., in the case of null-scheme).

Home Network Public Key List data object.
Contents:
This data object contains a list of the Home Network Public Key and the corresponding Home Network Public Key Identifier that shall be used by the ME to calculate the SUCI.

This data object may not be present if none of the protection scheme profiles identified by the Protection Scheme Identifiers included in the Protection Scheme Identifier List data object use the Home Network Public Key (e.g. null-scheme). If this data object is present, it shall contain at least one Home Network Public Key and the corresponding Home Network Public Key Identifier.

Coding:

| Description | Value | M/O/C | Length (bytes) |
|---|---|---|---|
| Home Network Public Key List data object | 'A1' | C | 1 |
| Home Network Public Key List data object length | L1 | C | Note 1 |
| Home Network Public Key 1 Identifier tag | '80' | C | 1 |
| Home Network Public Key 1 Identifier length | L2 | C | Note 1 |
| Home Network Public Key 1 Identifier | — | C | L2 |
| Home Network Public Key 1 tag | '81' | C | 1 |
| Home Network Public Key 1 length | L3 | C | Note 1 |
| Home Network Public Key 1 | — | C | L3 |
| ... | ... | ... | ... |
| Home Network Public Key N Identifier tag | '80' | O | 1 |
| Home Network Public Key N Identifier length | L4 | O | Note 1 |
| Home Network Public Key N Identifier | — | O | L4 |
| Home Network Public Key N tag | '81' | O | 1 |
| Home Network Public Key N length | L5 | O | Note 1 |
| Home Network Public Key N | — | O | L5 |

Note 1:
The length is coded according to ISO/IEC 8825-1 [35]

Routing Information TLV data object.
Contents:
This data object contains Routing Indicator that allows together with the MCC and MNC to route network signalling with SUCI to AUSF and UDM instances capable to serve the subscriber, as specified in 3GPP TS 23.003 (NPL 11). This data object may not be present in the case of null-scheme. If this data object is present, it shall have a valid Routing Indicator.

Coding:

| Description | Value | M/O/C | Length (bytes) |
|---|---|---|---|
| Routing Information TLV data object tag | 'A2' | C | 1 |
| Routing Information TLV data object length | L1 | C | Note 1 |
| Routing information TLV data object value | — | C | L1 |

Note 1:
The length is coded according to ISO/IEC 8825-1 [35]

Another Embodiment 2

The User Equipment (or "UE", "mobile station", "mobile device" or "wireless device") in the present disclosure is an entity connected to a network via a wireless interface.

It should be noted that the UE in this specification is not limited to a dedicated communication device, and can be applied to any device, having a communication function as a UE described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery.

It will be appreciated that the terms "UE" and "wireless device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IOT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IOT UE). It will be appreciated that a UE may support one or more IoT or MTC applications. Some examples of MTC applications are listed in the Table 1 (source: 33GPP TS 22.368 (NPL 12), Annex B, the contents of which are incorporated herein by reference). This list is not exhaustive and is intended to be indicative of some examples of machine-type communication applications.

TABLE 1

Some example of machine-type communication applications.

| Service Area | MTC applications |
| --- | --- |
| Security | Surveillance systems |
|  | Backup for landline |
|  | Control of physical access (e.g. to buildings) |
|  | Car/driver security |
| Tracking & Tracing | Fleet Management |
|  | Order Management |
|  | Pay as you drive |
|  | Asset Tracking |
|  | Navigation |
|  | Traffic infomation |
|  | Road tolling |
|  | Road traffic optimisation/steering |
| Payment | Point of sales |
|  | Vending machines |
|  | Gaming machines |
| Health | Monitoring vital signs |
|  | Supporting the aged or handicapped |
|  | Web Access Telemedicine points |
|  | Remote diagnostics |
| Remote Maintenance/ Control | Sensors |
|  | Lighting |
|  | Pumps |
|  | Valves |
|  | Elevator control |
|  | Vending machine control |
|  | Vehicle diagnostics |
| Metering | Power |
|  | Gas |
|  | Water |
|  | Heating |
|  | Grid control |
|  | Industrial metering |
| Consumer Devices | Digital photo frame |
|  | Digital camera |
|  | eBook |

Applications, services, and solutions may be an MVNO (Mobile Virtual Network Operator) service, an emergency radio communication system, a PBX (Private Branch exchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VOLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present document. Needless to say, these technical ideas and embodiments are not limited to the above-described UE and various modifications can be made thereto.

User Equipment (UE)

Figure 3:
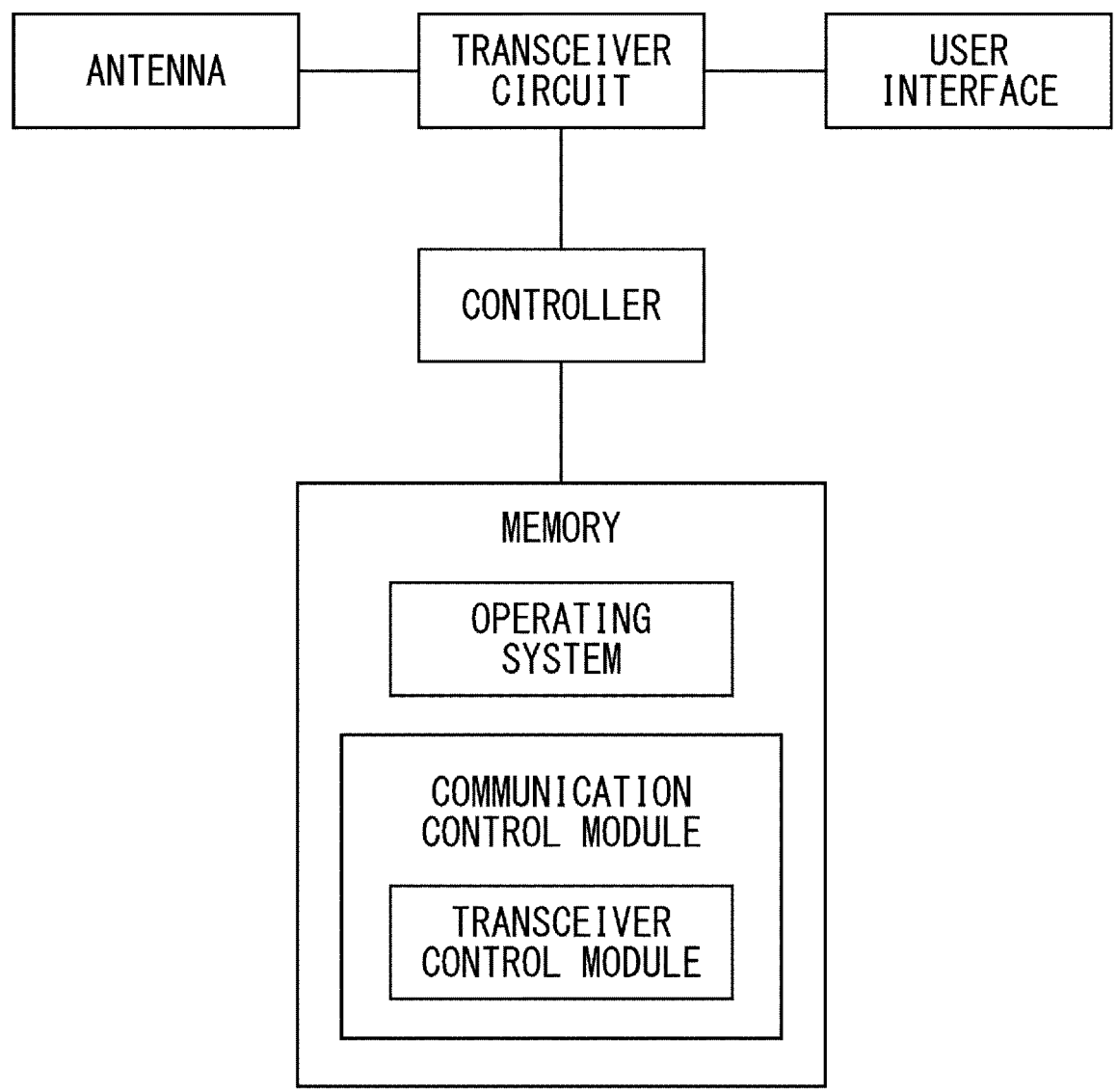
FIG. 3 is a block diagram showing a configuration example of a UE.

FIG. 3 is a block diagram illustrating the main components of the UE. As shown, the UE includes a transceiver circuit which is operable to transmit signals to and to receive signals from the connected node(s) via one or more antenna. Although not necessarily shown in FIG. 3, the UE will of course have all the usual functionality of a conventional mobile device (such as a user interface) and this may be provided by any one or any combination of hardware, software and firmware, as appropriate. Software may be pre-installed in the memory and/or may be downloaded via the telecommunication network or from a removable data storage device (RMD), for example. It should be noted that each arrow indicated in the subsequent block diagrams represent an example of a flow of a signal or data, but it is not intended that the flow of the signal or data is limited in a specific direction.

A controller controls the operation of the UE in accordance with software stored in a memory. For example, the controller may be realized by Central Processing Unit (CPU). The software includes, among other things, an operating system and a communications control module having at least a transceiver control module. The communications control module (using its transceiver control sub-module) is responsible for handling (generating/sending/receiving) signalling and uplink/downlink data packets between the UE and other nodes, such as the base station/(R)AN node, a MME, the AMF (and other core network nodes). Such signalling may include, for example, appropriately formatted signalling messages relating to connection establishment and maintenance (e.g. RRC messages), NAS messages such as periodic location update related messages (e.g. tracking area update, paging area updates, location area update) etc.

(R)AN Node

Figure 4:
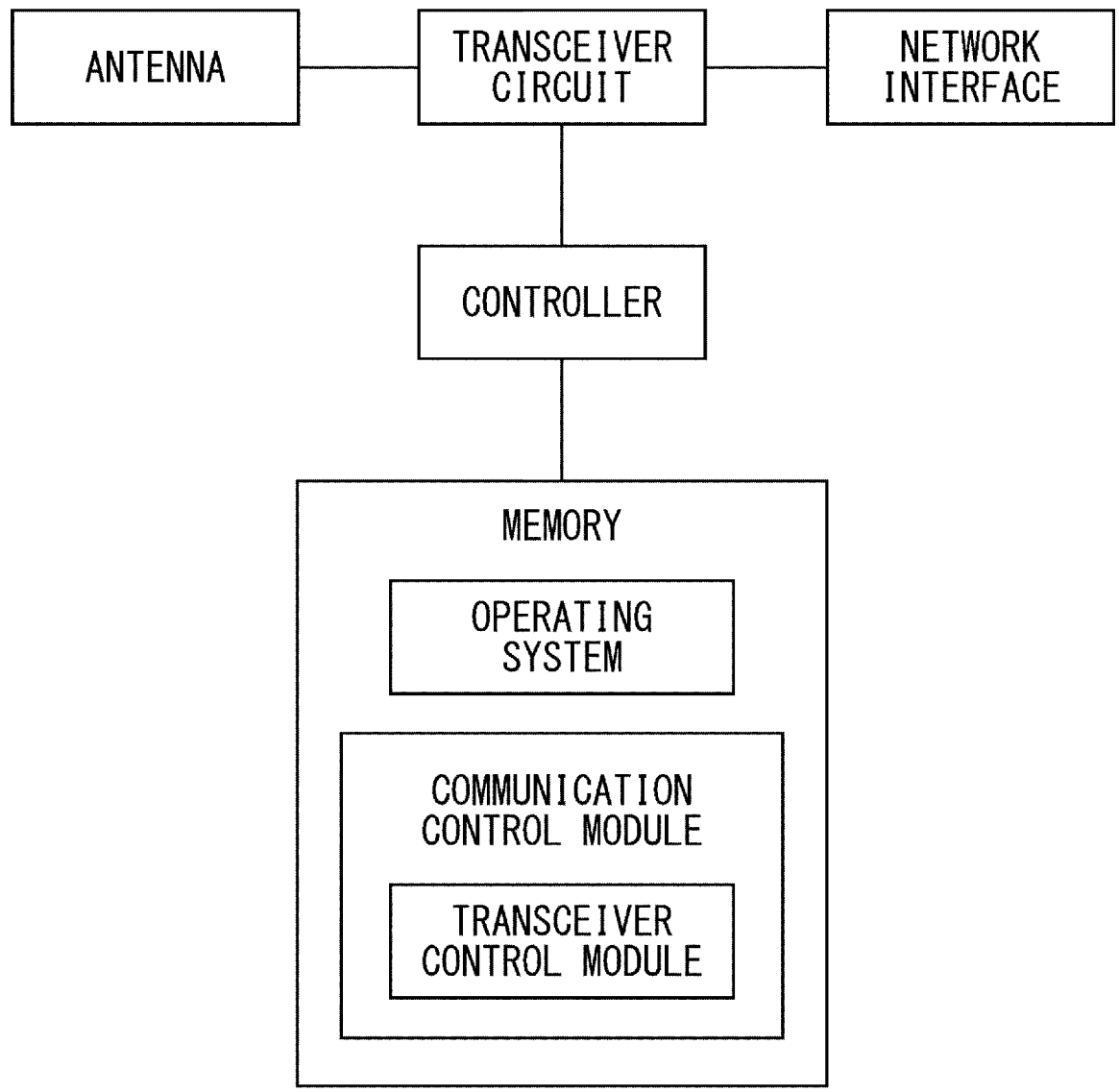
FIG. 4 is a block diagram showing a configuration example of a (R)AN.

FIG. 4 is a block diagram illustrating the main components of an exemplary (R)AN node, for example a base station ('eNB' in LTE, 'ng-eNB', 'gNB' in 5G). As shown, the (R)AN node includes a transceiver circuit which is operable to transmit signals to and to receive signals from connected UE(s) via one or more antenna and to transmit signals to and to receive signals from other network nodes (either directly or indirectly) via a network interface. A controller controls the operation of the (R)AN node in accordance with software stored in a memory. For example, the controller may be realized by Central Processing Unit (CPU). Software may be pre-installed in the memory and/or may be downloaded via the telecommunication network or from a removable data storage device (RMD), for example. The software includes, among other things, an operating system and a communications control module having at least a transceiver control module.

The communications control module (using its transceiver control sub-module) is responsible for handling (generating/sending/receiving) signalling between the (R)AN node and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller is also configured (by software or hardware) to handle related tasks such as, when implemented, UE mobility estimate and/or moving trajectory estimation.

AMF

Figure 5:
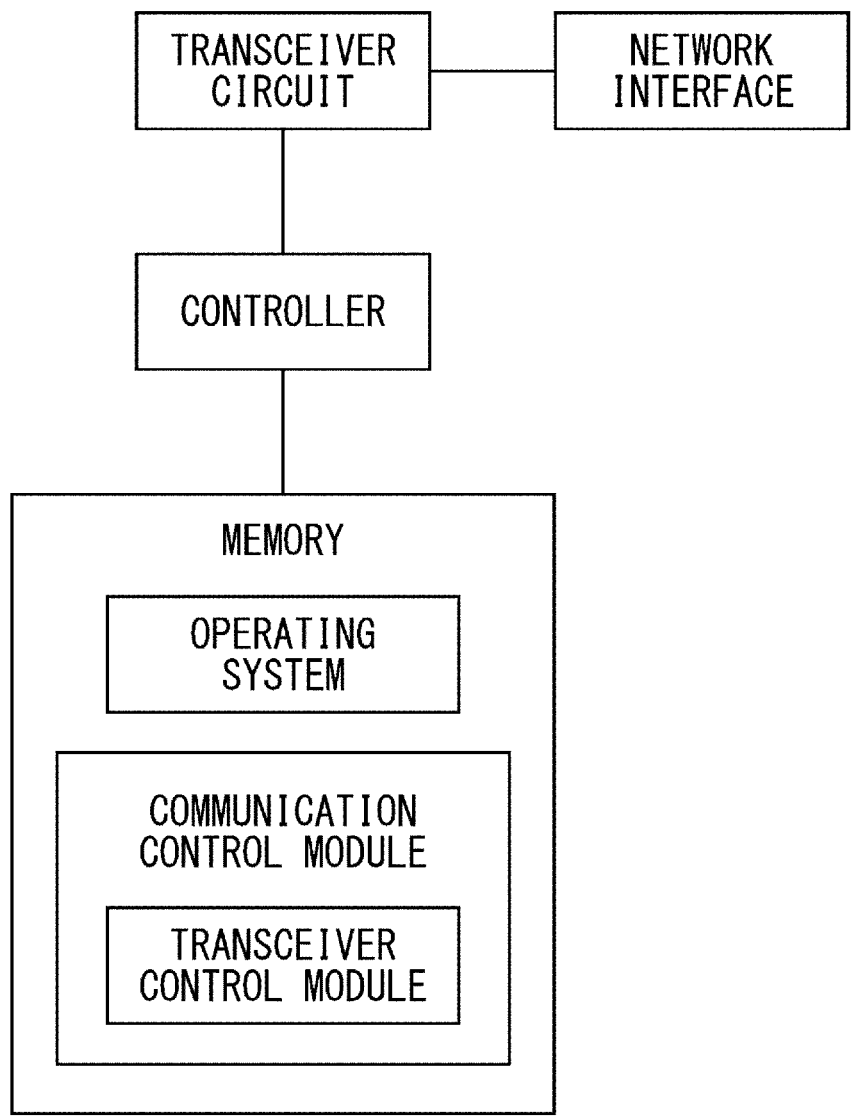
FIG. 5 is a block diagram showing a configuration example of an AMF.

FIG. 5 is a block diagram illustrating the main components of the AMF. The AMF is included in the 5GC. As shown, the AMF includes a transceiver circuit which is operable to transmit signals to and to receive signals from other nodes (including the UE) via a network interface. A controller controls the operation of the AMF in accordance with software stored in a memory. For example, the controller may be realized by Central Processing Unit (CPU). Software may be pre-installed in the memory and/or may be downloaded via the telecommunication network or from a removable data storage device (RMD), for example. The software includes, among other things, an operating system and a communications control module having at least a transceiver control module.

The communications control module (using its transceiver control sub-module) is responsible for handling (generating/sending/receiving) signalling between the AMF and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

As will be appreciated by one of skill in the art, the present disclosure may be embodied as a method, and system. Accordingly, the present disclosure may take the form of an entirely hardware embodiment, a software embodiment or an embodiment combining software and hardware aspects.

It will be understood that each block of the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. A general-purpose processor may be a microprocessor, but in the alternative, the processor may be any conventional processor, controller, microcontroller, or state machine. A processor may also be implemented as a combination of computing devices, e.g., a plurality of microprocessors, one or more microprocessors, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

This application is based upon and claims the benefit of priority from Indian provisional patent application No. 201811042142, filed on Nov. 8, 2018, the disclosure of which is incorporated herein in its entirety by reference.

What is claimed is:

1. A method of a communication apparatus, the method comprising:
  receiving at least one parameter specifically applicable to 5G in a case where association of a Subscription Permanent Identifier (SUPI) and an equipment identifier changes, wherein the equipment identifier is an International Mobile station Equipment Identity (IMEI); and
  sending the at least one parameter to a user equipment,
  wherein the at least one parameter is for providing 5G service to the user equipment equipped with a Subscriber Identity Module (SIM) which does not store the at least one parameter specifically applicable to 5G.

2. The method according to claim 1, the method further comprising:
  receiving, from the user equipment, a message after sending the at least one parameter.

3. The method according to claim 2, wherein the message is used to acknowledge reception of the at least one parameter.

4. The method according to claim 1, the method further comprising:
  informing that the user equipment receives the at least one parameter.

5. The method according to claim 1, wherein the at least one parameter is stored in Mobile Equipment (ME) of the user equipment.

6. A method of a communication apparatus, the method comprising:
  determining that an association of a Subscription Permanent Identifier (SUPI) and an equipment identifier changes, wherein the equipment identifier is an International Mobile station Equipment Identity (IMEI); and
  sending at least one parameter specifically applicable to 5G in a case where the association of the SUPI and the equipment identifier changes,
  wherein the at least one parameter is for providing 5G service to a user equipment equipped with a Subscriber Identity Module (SIM) which does not store the at least one parameter specifically applicable to 5G.

7. The method according to claim 6, wherein the at least one parameter is stored in Mobile Equipment (ME) of the user equipment.

8. A method of a user equipment, the method comprising:
  receiving at least one parameter specifically applicable to 5G for providing 5G service to the user equipment equipped with a Subscriber Identity Module (SIM) which does not store the at least one parameter specifically applicable to 5G, in a case where an association of a Subscription Permanent Identifier (SUPI) and an equipment identifier changes, wherein the equipment identifier is an International Mobile station Equipment Identity (IMEI); and
  sending, to an Access and Mobility management function, a message after receiving the at least one parameter.

9. The method according to claim 8, wherein the message is used to acknowledge reception of the at least one parameter.

10. The method according to claim 8, wherein the at least one parameter is stored in Mobile Equipment (ME) of the user equipment.

11. A communication apparatus comprising:
  a memory; and
  at least one hardware processor coupled to the memory,
  wherein the at least one hardware processor is configured to:
    receive at least one parameter specifically applicable to 5G in a case where association of a Subscription Permanent Identifier (SUPI) and an equipment identifier changes, wherein the equipment identifier is an International Mobile station Equipment Identity (IMEI); and
    send the at least one parameter to a user equipment,
    wherein the at least one parameter is for providing 5G service to the user equipment equipped with a Subscriber Identity Module (SIM) which does not store the at least one parameter specifically applicable to 5G.

12. The communication apparatus according to claim 11, wherein the at least one hardware processor is configured to receive, from the user equipment, a message after sending the at least one parameter.

13. The communication apparatus according to claim 12, wherein the message is used to acknowledge reception of the at least one parameter.

14. The communication apparatus according to claim 11, wherein the at least one hardware processor is configured to inform that the user equipment receives the at least one parameter.

15. The communication apparatus according to claim 11, wherein the at least one parameter is stored in Mobile Equipment (ME) of the user equipment.

16. A communication apparatus comprising:
  a memory; and
  at least one hardware processor coupled to the memory,
  wherein the at least one hardware processor is configured to:
    determine that an association of a Subscription Permanent Identifier (SUPI) and an equipment identifier changes, wherein the equipment identifier is an International Mobile station Equipment Identity (IMEI); and
    send at least one parameter specifically applicable to 5G in a case where the association of the SUPI and the equipment identifier changes,
    wherein the at least one parameter is for providing 5G service to a user equipment equipped with a Subscriber Identity Module (SIM) which does not store the at least one parameter specifically applicable to 5G.

17. The communication apparatus according to claim 16, wherein the at least one parameter is stored in Mobile Equipment (ME) of the user equipment.

18. A user equipment comprising:
a memory; and
at least one hardware processor coupled to the memory, wherein the at least one hardware processor is configured to:
  receive at least one parameter specifically applicable to 5G for providing 5G service to the user equipment equipped with a Subscriber Identity Module (SIM) which does not store the at least one parameter specifically applicable to 5G, in a case where an association of a Subscription Permanent Identifier (SUPI) and an equipment identifier changes, wherein the equipment identifier is an International Mobile station Equipment Identity (IMEI; and
  send, to an Access and Mobility management function, a message after receiving the at least one parameter.

19. The user equipment according to claim 18, wherein the message is used to acknowledge reception of the at least one parameter.

20. The user equipment according to claim 18, wherein the at least one parameter is stored in Mobile Equipment (ME) of the user equipment.

* * * * *